Patented Dec. 18, 1951

2,579,299

UNITED STATES PATENT OFFICE 2,579,299

CHLORINATED ISOBORNYL CHLORIDE INSECTICIDAL COMPOSITION

George Allen Buntin, Wilmington, Del., assignor to Hercules Powder Company, Wilmington, Del., a corporation of Delaware No Drawing. Application April 8, 1948,
Serial No. 19,868

8 Claims. (Cl. 167—30)

This invention relates to insecticidal compositions and more particularly to insecticidal compositions containing a highly chlorinated isobornyl chloride as the toxic ingredient.

Among the more commonly used insecticidal toxicants are the naturally occurring products, pyrethrum, rotenone, and nicotine. These natural products have the very great disadvantage of not being uniform in their insecticidal activity and thus make it difficult to formulate insecticidal compositions. Many synthetic products have been suggested in the past as substitutes for these toxicants; however, they are usually lacking in one respect or another. Either they do not have a high enough killing power and must be used in concentrations which cause irritation to the user, or, if they are sufficiently toxic, they are also toxic to forms of animal life other than insect pests.

Now in accordance with this invention it has been found that insecticidal compositions containing as the toxic ingredient a chlorinated isobornyl chloride which has a chlorine content of from about 50% to about 75% possess an unusual degree of insecticidal activity. Because of the very high killing power of a chlorinated isobornyl chloride containing 50% to 75% chlorine, extremely dilute solutions of these toxicants are effective.

The following examples will illustrate the preparation and insecticidal activity of insecticidal compositions containing these chlorinated isobornyl chlorides.

*Example 1*

Isobornyl chloride was prepared by dissolving 2 parts of pure camphene in 1 part of ethyl bromide and saturating the solution with hydrogen chloride at 10°–20° C. The solution was then heated to 55°–60° C. for 6 days, after which the ethyl bromide was distilled off at a pressure of 30 mm. using a dry nitrogen sparge. The soft white powder which was left as a residue was then dried. The crude isobornyl chloride was dissolved in warm amyl alcohol and allowed to stand for 2 days at 3° C. The crystals which formed were filtered out, slurried with cold methanol, again filtered and finally were dried in a vacuum desicator over solid potassium hydroxide. The snow-white crystals of isobornyl chloride so obtained had a melting point of 157°–160° C. and contained 19.9% chlorine (theory 20.5%).

One part of the pure isobornyl chloride was dissolved in 5 parts of carbon tetrachloride. Chlorine was then passed into the agitated solution which was exposed to ultraviolet illumination. The temperature rose, due to the heat of reaction, to about 75° C. and remained at a temperature of about 68°–74° C. during the chlorination. Samples were removed at intervals during the chlorination, a total of 7 samples being removed. The carbon tetrachloride was removed from each of these samples by sparging with nitrogen at 100° C. under reduced pressure. The products were soft, yellow, waxy solids.

The 7 chlorinated isobornyl chlorides of different chlorine content were tested for their insecticidal activity against houseflies. The test for insecticidal activity against houseflies was made in the following manner and is referred to as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analysis for chlorine content and of tests made on 0.5% solutions in deodorized kerosene of the above chlorinated isobornyl chlorides are given in the following table. The data are an average of a series of tests made on each solution.

| Chlorination Time in Hrs. | Per Cent Chlorine | Per Cent Dead in 24 Hrs. | O. T. I. Difference |
|---|---|---|---|
| 1.25 | 42.7 | 22 | −34 |
| 1.6 | 50.0 | 56 | 0 |
| 1.75 | 52.0 | 70 | +19 |
| 2.75 | 62.8 | 100 | +49 |
| 3.75 | 68.1 | 100 | +49 |
| 16 | 69.1 | 100 | +49 |
| 24 | 74.0 | 89 | +33 |

*Example 2*

An insecticidal dust containing a chlorinated isobornyl chloride as the toxicant was prepared by dissolving a chlorinated isobornyl chloride containing 68.1% chlorine in kerosene and spraying this solution onto fuller's earth. This mixture containing 40% of the chlorinated isobornyl chloride was then ground and mixed with pyrophyllite to prepare a final dust containing 20% of the chlorinated isobornyl chloride. This dust was found to be very effective when tested against cotton insects.

The chlorinated isobornyl chloride which is used as the toxic ingredient of the insecticidal compositions in accordance with this invention should contain an amount of chlorine of from about 50% to about 75% and preferably from about 60% to about 72%. As may be seen from the foregoing examples, a chlorinated isobornyl chloride having a chlorine content within these ranges has a very high insecticidal activity, a kill of approximately 100% being obtained within the more preferable range.

The isobornyl chloride which is chlorinated to obtain the chlorinated isobornyl chloride containing from about 50% to about 75% chlorine may readily be obtained by saturating camphene, either pure camphene or any commercial source of camphene, with hydrogen chloride and then heating the camphene hydrochloride so obtained whereby it is isomerized to isobornyl chloride. The crystals of isobornyl chloride may then be separated and chlorinated or the crude reaction mixture may be chlorinated directly. Isobornyl chloride being a solid, the chlorination is more easily carried out in the presence of a solvent. Suitable solvents for the chlorination are chloroform, carbon tetrachloride, pentachloroethane, etc. Chlorination catalysts may be used if desired, ultraviolet light being particularly efficient.

The insecticidal compositions of this invention may be made up of the chlorinated isobornyl chloride admixed with any suitable type of diluent. If a liquid spray is desired, the chlorinated isobornyl chloride may be dissolved in any convenient solvent, such as deodorized kerosene, or is may be dispersed in water to form an aqueous spray. Insecticidal dusts may be prepared by placing the chlorinated isobornyl chloride on a diluent or carrier such as powdered carbon, kieselguhr, bentonite, pyrophyllite, etc.

For many purposes it may be desirable to use the chlorinated isobornyl chloride in combination with other insecticidal toxicants. Many toxicants have a very high knockdown in relatively dilute solutions, but much higher concentrations must be used in order to obtain the desired degree of kill. Due to the very high degree of killing power which a chlorinated isobornyl chloride containing about 50% to about 75% chlorine possesses, it may be added to such toxicants, thereby enabling the use of a much more dilute solution than would otherwise be possible in the finished insecticide. Toxicants with which the chlorinated isobornyl chloride may be combined include such compounds as rotenone, pyrethrum, and organic thiocyanates such as alkyl thiocyanates, thiocyano ethers such as β-butoxy-β'-thiocyanoethyl ether, and terpene thiocyanoacylates such as isobornyl thiocyanoacetate, fenchyl thiocyanoacetate, and isobornyl α-thiocyanopropionate.

The very high insecticidal activity of a chlorinated isobornyl chloride containing from about 5C% to about 75% chlorine is illustrated by the foregoing examples. The amount of the chlorinated isobornyl chloride to be admixed with the diluent depends upon the use to which the insecticidal composition will be put. For example, for use as a household spray, the chlorinated iso-bornyl chloride is very effective at a concentration of 0.5% in deodorized kerosene, but when used as an agricultural dust a concentration of 10% to 20% or more may be desirable. The insecticidal compositions of this invention are useful in combatting flies, mosquitoes, roaches, moths, carpet beetles, bed bugs, and many other pests.

This application is a continuation-in-part of my application for United States Letters Patent Serial Number 609,027, filed August 4, 1945, now abandoned.

What I claim and desire to protect by Letters Patent is:

1. An insecticidal composition comprising the product obtained by chlorination of isobornyl chloride with chlorine gas at an elevated temperature, below the temperature at which the product decomposes, to a chlorine content of from about 50% to about 75% chlorine and an insecticidal adjuvant as a carrier therefor.

2. An insecticidal composition comprising the product obtained by chlorination of isobornyl chloride with chlorine gas at an elevated temperature, below the temperature at which the product decomposes, to a chlorine content of from about 60% to about 72% chlorine and an insecticidal adjuvant as a carrier therefor.

3. An insecticidal composition comprising the product obtained by chlorination of isobornyl chloride with chlorine gas at an elevated temperature, below the temperature at which the produce decomposes, to a chlorine content of from about 50% to about 75% chlorine and a hydrocarbon solvent insecticidal adjuvant as a carrier therefor.

4. An insecticidal composition comprising the product obtained by chlorination of isobornyl chloride with chlorine gas at an elevated temperature, below the temperature at which the product decomposes, to a chlorine content of from about 50% to about 75% chlorine and a solid insecticidal adjuvant as a carrier therefor.

5. An insecticidal composition comprising an aqueous insecticidal dispersion of the product obtained by the chlorination of isobornyl chloride with chlorine gas at an elevated temperature, below the temperature at which the product decomposes, to a chlorine content of from about 50% to about 75% chlorine.

6. An insecticidal composition comprising the product obtained by chlorination of isobornyl chloride with chlorine gas at an elevated temperature, below the temperature at which the product decomposes, to a chlorine content of from about 60% to about 72% chlorine and a hydrocarbon solvent insecticidal adjuvant as a carrier therefor.

7. An insecticidal composition comprising the product obtained by chlorination of isobornyl chloride with chlorine gas at an elevated temperature, below the temperature at which the chlorinated product decomposes, to a chlorine content of from about 60% to about 72% chlorine and a solid insecticidal adjuvant as a carrier therefor.

8. An insecticidal composition comprising an aqueous insecticidal dispersion of the product obtained by the chlorination of isobornyl chloride with chlorine gas at an elevated temperature, below the temperature at which the product decomposes, to a chlorine content of from about 60% to about 72% chlorine.

GEORGE ALLEN BUNTIN.

(References on following page)

REFERENCES CITED

The following references are of record in the file of this patent:

UNITED STATES PATENTS

| Number | Name | Date |
|---|---|---|
| 1,366,106 | Weeks | Jan. 18, 1921 |
| 2,010,841 | Bender | Aug. 13, 1935 |
| 2,337,043 | Hasselstrom et al. | Dec. 21, 1943 |

OTHER REFERENCES

Simonsen, "The Terpenes," vol. II, pp. 142, 143, and 148 (1932).

Roark, "A Second Index of Patented Mothproofing Materials," U. S. D. A. Bureau of Chemistry and Soils, Insecticide Division, February 1933 p. 84, 167—37.

Desalbres et al., Chimie and Industrie, vol. 58, p. 443–448 (1947), thru Chem. Abstracts, vol. 42, p. 2719 (1948).

Frankforter, J. Am. Chem. Soc., vol. 28, pages 1461–1465 (1906).

Simonsen, "The Terpenes," vol. II, pages 140, 221 (1932).